(12) United States Patent
Sidhu et al.

(10) Patent No.: US 9,017,509 B2
(45) Date of Patent: Apr. 28, 2015

(54) OPTICAL FIBRE FIXED ON SUBSTRATES

(75) Inventors: Jagjit Sidhu, Bristol (GB); Henry Jameson White, Bristol (GB); Nigel Bruce Aldridge, Wotton-under-Edge (GB)

(73) Assignee: BAE Systems PLC, London (GB)

( * ) Notice: Subject to any disclaimer, the term of this patent is extended or adjusted under 35 U.S.C. 154(b) by 165 days.

(21) Appl. No.: 13/581,445

(22) PCT Filed: Feb. 28, 2011

(86) PCT No.: PCT/GB2011/050392
§ 371 (c)(1),
(2), (4) Date: Aug. 27, 2012

(87) PCT Pub. No.: WO2011/107779
PCT Pub. Date: Sep. 9, 2011

(65) Prior Publication Data
US 2013/0228274 A1    Sep. 5, 2013

(30) Foreign Application Priority Data

Mar. 2, 2010 (EP) .................... 10275024
Mar. 2, 2010 (GB) .................... 1003451.0

(51) Int. Cl.
*B32B 37/14* (2006.01)
*G02B 6/36* (2006.01)
*B32B 37/12* (2006.01)

(52) U.S. Cl.
CPC .............. *B32B 37/14* (2013.01); *Y10T 156/17* (2015.01); *Y10T 156/10* (2015.01); *G02B 6/3612* (2013.01); *B32B 37/12* (2013.01)

(58) Field of Classification Search
CPC ...... B32B 37/14; B32B 37/12; G02B 6/3612; G02B 6/36; G02B 6/3608
USPC ........................ 156/280, 60, 272.2
See application file for complete search history.

(56) References Cited

U.S. PATENT DOCUMENTS 4,693,778 A * 9/1987 Swiggett et al. .............. 156/361
6,324,325 B1  11/2001 Booth et al.
(Continued)

FOREIGN PATENT DOCUMENTS

EP    1 041 410 A1   10/2000
EP    1041410 A1  * 10/2000
(Continued)

OTHER PUBLICATIONS

International Search Report (PCT/ISA/210) issued on May 30, 2011, by the United Kingdom Patent Office as the International Searching Authority for International Application No. PCT/GB2011/050392.
(Continued)

*Primary Examiner* — Daniel McNally
(74) *Attorney, Agent, or Firm* — Maine Cernota & Rardin

(57) ABSTRACT

A method and apparatus are disclosed for the formation of optical fiber structures. An exemplary fiber laying head houses a source of optical fiber material to which an adhesive coating is applied prior to laying the adhesive-coated optical fiber material onto a substrate. The fiber laying head can also house a radiation source that generates a radiation beam to cure the adhesive in the adhesive-coated optical fiber material to form a bond between the adhesive-coated optical fiber material and the substrate.

6 Claims, 5 Drawing Sheets

(56) References Cited

U.S. PATENT DOCUMENTS

| | | | |
|---|---|---|---|
| 6,370,293 | B1 | 4/2002 | Emmerich et al. |
| 6,529,650 | B1 | 3/2003 | Tsuru |
| 2003/0068504 | A1 | 4/2003 | Joseph |
| 2007/0264425 | A1 * | 11/2007 | Kubo et al. ............... 427/163.2 |

FOREIGN PATENT DOCUMENTS

| | | |
|---|---|---|
| EP | 1 085 355 A2 | 3/2001 |
| GB | 2 197 727 A | 5/1988 |
| JP | 2000-056188 A | 2/2000 |
| JP | 2000056188 A * | 2/2000 |
| JP | 2008-026368 A | 2/2008 |
| WO | WO 2009/136526 A1 | 11/2009 |

OTHER PUBLICATIONS

United Kingdom Search Report issued on Jun. 21, 2010 for Application No. GB 1003451.0.

European Search Report issued on Jul. 22, 2010 for Application No. EP 10275024.7.

NotificatiNotification Concerning Transmittal of International Preliminary Report on Patentability (Forms PCT/IB/326 and PCT/IB/373) and the Written Opinion of the International Searching Authority (Form PCT/ISA/237) issued on Sep. 13, 2012, in the corresponding International Application No. PCT/GB2011/050392. (8 pages).

* cited by examiner

OPTICAL FIBRE FIXED ON SUBSTRATES

RELATED APPLICATIONS

This application is a national phase application filed under 35 USC §371 of PCT Application No. PCT/GB2011/050392, filed on Feb. 28, 2011 which claims priority to GB Patent Application 1003451.0, filed on Mar. 2, 2010 and EP Patent Application 10275024.7, filed on Mar. 2, 2010. Each of these applications is herein incorporated by reference in their entirety for all purposes.

The present invention relates to optical fibre structures.

Optical fibres are widely used in many applications including communications and control systems. In such applications, the optical fibre is connected to a linkage node at each end. One linkage node sends signals containing relevant information from a signal source into the optical fibre and the other node receives the transmitted signals for transmission to other apparatus.

However, due to the fragile nature of optical fibres, they are usually overprotected using heavy and bulky protective sleeving to reduce the likelihood of damage and attachment of the optical fibres to the supporting structure is not easily accomplished.

It is an object of the present invention to provide a method for forming optical fibre structures which is simple and which eliminates the need for heavy and bulky protective sleeving.

According to one aspect of the present invention, there is provided a method of forming an optical fibre structure, the method comprising the steps of: a) applying an adhesive-coated optical fibre material onto a substrate; and b) curing the adhesive to adhere the optical fibre material to the substrate. The method of the invention thus provides a simple and safe method of applying optical fibres to structures where the structure automatically provides support and some protection to the optical fibre such that the optical fibre does not need the bulky protective sleeving.

The method may further comprise the step of protectively coating the adhesive-coated optical fibre material on the substrate prior to step b). Alternatively, the step of protectively coating the adhesive-coated optical fibre material may occur after the material has been cured. This additional protective coating will provide protection to the optical fibre in substitution for any sleeving as previously used and will tend to be far less bulky than sleeving provided around the optical fibre and may also help to provide overall strength to the substrate. This may allow a substrate such as fibre reinforced plastics composite to be reduced in size because the protective coating, if comprising the same matrix material as used for the composite, may add back the strength lost by the size reduction.

In one embodiment of the present invention, the adhesive-coated optical fibre material comprises a fibre having uncured adhesive applied thereto. The adhesive-coated fibre material may comprise a single optical fibre or many such fibres embedded within an adhesive. The adhesive-coated optical fibre material may be in the form of a fibre tape having at least one fibre arranged in an adhesive layer. The fibre tape may comprise a ribbon fibre. In either case, the method of the present invention may further comprise, prior to step a), the step of dispensing the adhesive-coated optical fibre material from a spool.

In another embodiment of the present invention, the method further comprises, prior to step a), the step of coating at least one fibre with liquid adhesive to form the adhesive-coated optical fibre material.

In accordance with a second aspect of the present invention, there is provided apparatus for laying an adhesive-coated optical fibre material onto a substrate to form an optical fibre structure, the apparatus comprising: a dispenser arrangement for dispensing the adhesive-coated optical fibre material onto the substrate; and a curing arrangement for curing the adhesive in the adhesive-coated optical fibre material to bond the adhesive-coated optical fibre material to the substrate.

The curing arrangement may comprise a source of radiation arranged to irradiate the adhesive-coated optical fibre material to cure the adhesive therein. The source of radiation may comprise ultraviolet or infrared radiation. In each case, the adhesive in the adhesive-coated optical fibre material is chosen to be cured by ultraviolet or infrared radiation, respectively. The adhesive may also be cured using convection heat, such as heat from a hot air gun.

The dispenser arrangement may comprise a spool of the adhesive-coated optical fibre material. Alternatively, the dispenser arrangement may comprise a spool of optical fibre material and an adhesive applicator, the fibre material from the spool passing through the adhesive applicator to form the adhesive-coated optical fibre material. The adhesive applicator may include a nozzle through which the adhesive-coated material is applied to the substrate.

Advantageously, the dispenser arrangement further comprises a guide for guiding the adhesive-coated optical fibre material onto the substrate and for holding it in position on the substrate prior to curing. The guide may include a splice for sizing the material to a particular length.

If extra protection is required for the optical fibre material within the fibre structure, a protective coating arrangement may be provided for coating the adhesive-coated material on the substrate. The coating arrangement may be located either upstream or downstream of the curing arrangement; that is to say, the coating may be applied either pre- or post-curing.

In a particular embodiment, a fibre laying head comprises the apparatus of the second aspect of the invention mounted on a robotic arm. This has the advantage that the fibre laying head can be used for the formation of fibre structures in confined or environmentally hazardous spaces. As an alternative, the fibre laying head can also be incorporated into a mobile robot, such as a robotic crawler, that can access normally inaccessible cavities such as the inside of pipes.

It will be appreciated that the fibre laying head can also be operated manually by an operator.

For a better understanding of the present invention, reference will now be made, by way of example only, to the accompanying drawings in which:—

Figure 1:
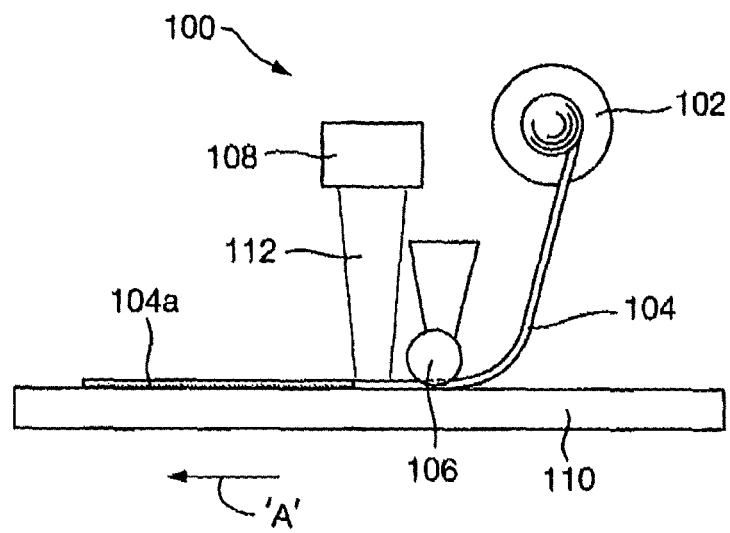
FIG. 1 is a schematic view of optical fibre laying apparatus in accordance with a first embodiment of the present invention.

Referring to FIG. 1, optical fibre laying apparatus 100 is shown. The apparatus 100 comprises an optical fibre spool 102 containing optical fibre 104 coated with uncured adhesive (not shown), a fibre guide 106 and a radiation source 108 located downstream of the fibre guide 106.

A substrate 110 is also shown that can be moved relative to the optical fibre laying apparatus 100 in the direction indicated by arrow 'A'.

As the substrate 110 moves in the direction of arrow 'A' relative to the optical fibre laying apparatus 100, optical fibre 104 is dispensed from the optical fibre spool 102 and is guided and held down onto the substrate 110 by the fibre guide 106. The radiation source 108 provides adhesive curing radiation 112 for the uncured adhesive coating on the optical fibre 104 so that the optical fibre 104 adheres to the substrate 110 and becomes bonded thereto and an integral part thereof as indicated at 104*a*.

The radiation source 108 dispenses ultraviolet (UV) radiation and the uncured adhesive coating is one that is curable by UV radiation. An example of such a coating is Ultrabond 774 which cures with great optical clarity and provides excellent resistance to humidity and moisture and is resistant to discoloration over long periods of time. Other suitable UV cured adhesives can be used, for example, a Loctite UV adhesive [Loctite is a registered trade mark of Henkel Corporation of Gulph Mills, Pa. 19406, USA].

The optical fibre 104 comprises either glass or plastics material.

Although the optical fibre 104 has been described as a single fibre element, it will be appreciated that the optical fibre 104 may comprise more than one fibre element forming a strip of fibre elements.

If the adhesive used is clear when cured, the apparatus 100 can also be used to lay optical fibres on top of one another, the optical fibres comprising either single fibre elements or strips of fibre elements or any combination thereof.

Although the substrate 110 has been described as moving relative to the apparatus 100 where the apparatus 100 is fixed, it will readily be appreciated that the substrate 110 may be fixed and the apparatus 100 arranged to move relative to the substrate.

The apparatus 100 may be of such a size that it can be hand-held for operation and moved over the substrate 110 manually. Alternatively, the apparatus 100 can be held by a robotic arm that may allow improved access to confined or environmentally hazardous spaces.

Figure 2:
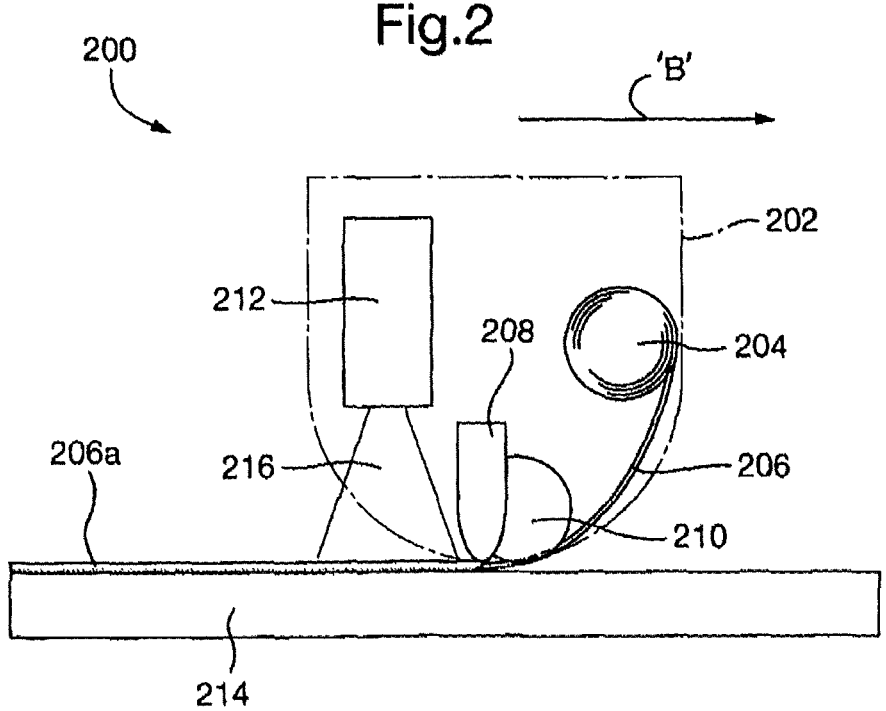
FIG. 2 is a schematic view of a fibre laying head in accordance with the present invention.

FIG. 2 illustrates fibre laying apparatus 200 in which the elements of apparatus 100 of FIG. 1 are mounted in a single housing 202.

The fibre laying apparatus 200 comprises a housing 202 in which is mounted a spool 204 containing optical fibre 206, a fibre guide and splicing device 208, an adhesive dispenser 210 and a radiation source 212. In this case, the optical fibre 206 is uncoated and the adhesive is applied during the laying down of the optical fibre 206 onto a substrate 214.

As the fibre laying apparatus 200 is moved relative to the substrate 214 in the direction indicated by arrow 'B', the optical fibre 206 is dispensed from the spool 204 and passes through the fibre guide and splicing device 208. The device 208 holds the optical fibre 206 onto the substrate 214 for application of adhesive (not shown). The adhesive dispenser 210 is located downstream of the device 208 and operates to apply adhesive to (or wet) the dispensed optical fibre 206. The radiation source 212 is located downstream of the adhesive dispenser 210 and generates a beam of radiation 216 for illuminating the fibre 206 so as to cure the adhesive and secure the fibre 206 to the substrate 214 as indicated at 206*a*.

When a desired length of fibre 206*a* has been laid on the substrate 214, the device 208 splices the fibre 206 to terminate application to the substrate 214. The device 210 holds the free end of the fibre 206 in place ready for the next substrate onto which the fibre 206 needs to be applied.

Many different adhesives can be used. The specific adhesive is chosen in accordance with the fibre thickness, the fibre type (glass or plastics), and the substrate onto which the optical fibre is to be adhered. A clear adhesive (when cured) can be used to connect fibres to components such as beam splitters, sensors etc.

Subsequent adhesive or coating layers may also be applied. These layers are selected for the specific protection required. However, the adhesive and the subsequent coating layers may also include additional functionalities, for example, protection due to particular environmental conditions. One example of this is that light leaking from the optical fibre may induce fluorescence in the coating and the nature of the fluorescence may be affected by the environmental conditions, such as, humidity, temperature, pressure etc.

Fibre laying apparatus 200 as described in FIG. 2 may have more than one type of adhesive, each one having a different purpose. For example, if a clear curing adhesive does not have the required properties for adhering the fibre to the substrate, this could be used for inter-fibre or component connection with a different adhesive being used to stick the fibre to the substrate.

Figure 3:
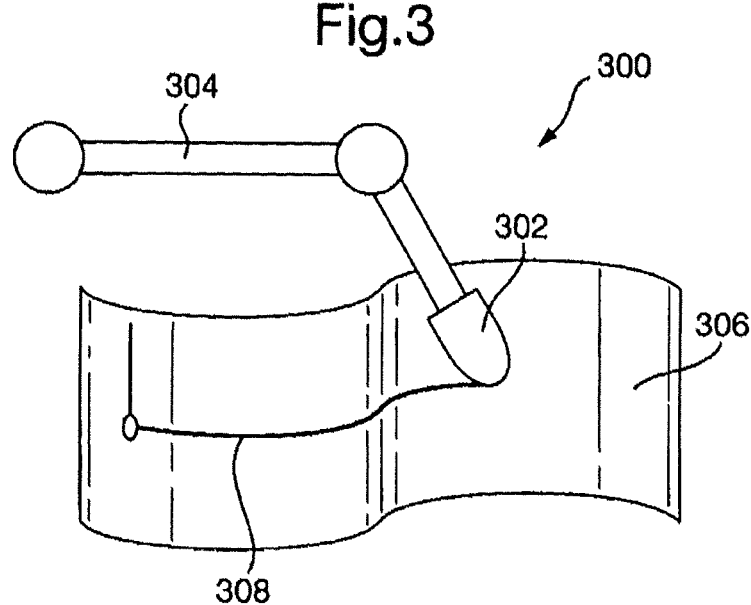
FIG. 3 is a schematic view of a fibre laying head comprising a robotic arm in accordance with the present invention.

FIG. 3 illustrates a fibre laying head 300 in which fibre laying apparatus 302 similar to the fibre laying apparatus 200 of FIG. 2 is attached to a robotic arm 304. The robotic arm 304 operates to move the apparatus 302 relative to a substrate 306 to lay down an optical fibre 308 onto the substrate 306. The robotic arm 304 may take any suitable form to provide appropriate control for the apparatus 302.

Figure 4:
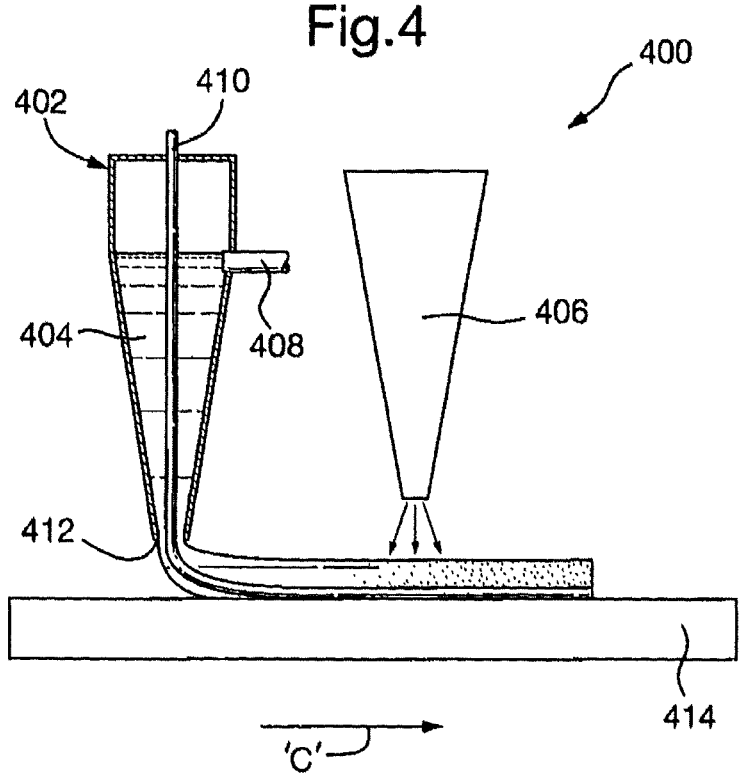
FIG. 4 is a schematic view of optical fibre laying apparatus in accordance with a second embodiment of the present invention.

FIG. 4 illustrates another arrangement 400 of the apparatus in accordance with the present invention. The arrangement 400 comprises a dispenser 402 containing a liquid adhesive 404 and a curing head 406 located downstream of the dispenser 402. The dispenser 402 has a top up mechanism 408 to ensure that the level of liquid adhesive 404 remains substantially constant.

Optical fibre 410 is fed from a spool (not shown) into the dispenser 402, through the liquid adhesive 404 and out through a nozzle 412. The nozzle 412 is located at a substrate 414 onto which the optical fibre 410 is to be laid. As the optical fibre 410 passes through the dispenser 402, the liquid adhesive 404 wets the fibre and provides sufficient adhesion to hold the optical fibre 410 in position temporarily on a substrate 414. The substrate 414 is arranged for movement relative to the dispenser 402 and the curing head 406 in the direction indicated by arrow 'C'.

Movement of the substrate 414 in the direction of arrow 'C' draws the optical fibre 410 with it due to the temporary adhesion of the wetted optical fibre 410 with the substrate 414. The curing head 406 dries and cures the liquid adhesive to secure the optical fibre 410 to the substrate 414.

Although only one curing head 406 is shown, it will be appreciated that more than one such head can be provided, for example, one for drying the adhesive and one for curing it.

The arrangement shown in FIG. 4 can be automated so that the laying down of optical fibre 410 and its subsequent drying/curing is carried out without the need for the intervention of an operator.

Figure 5:
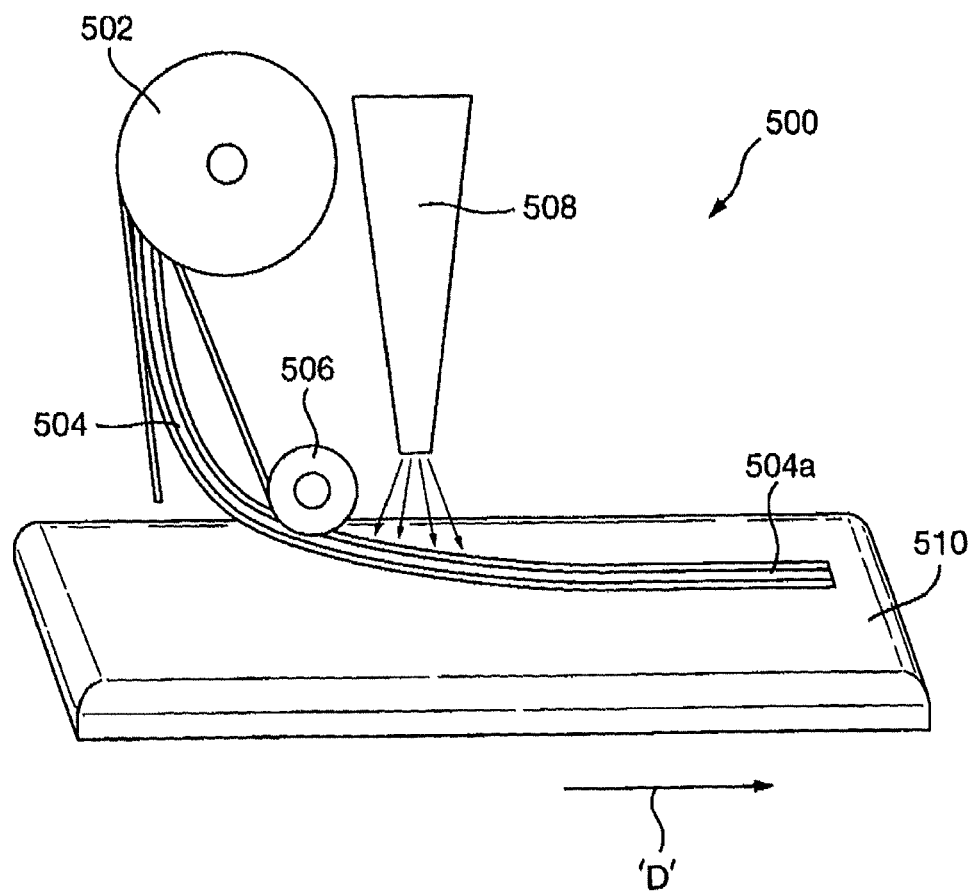
FIG. 5 is a schematic view of optical fibre laying apparatus in accordance with a third embodiment of the present invention.

FIG. 5 illustrates a further arrangement 500 of apparatus in accordance with the present invention. A spool 502 of optical fibre tape 504 is mounted to feed a tape guide 506. A curing tool 508 is located downstream of the tape guide 506. A substrate 510 is mounted for relative movement with respect to the tape guide 506 and curing tool 508 in the direction indicated by arrow 'D'.

The optical fibre tape 504 comprises at least one optical fibre in adhesive. Naturally, the optical fibre tape 504 may comprise several optical fibres arranged side by side within adhesive to form the tape.

As the substrate 510 moves relative to the tape guide 506 and curing tool 508 in the direction indicated by arrow 'D', optical fibre tape 504 is positioned on the substrate 510 by the tape guide 506 and the curing tool 508 cures the adhesive so that it sets and bonds the optical fibre tape 504 to the substrate 510 as indicated by 504a.

In this arrangement, the laying down of the optical fibre tape and its subsequent curing can be automated.

Figure 6:
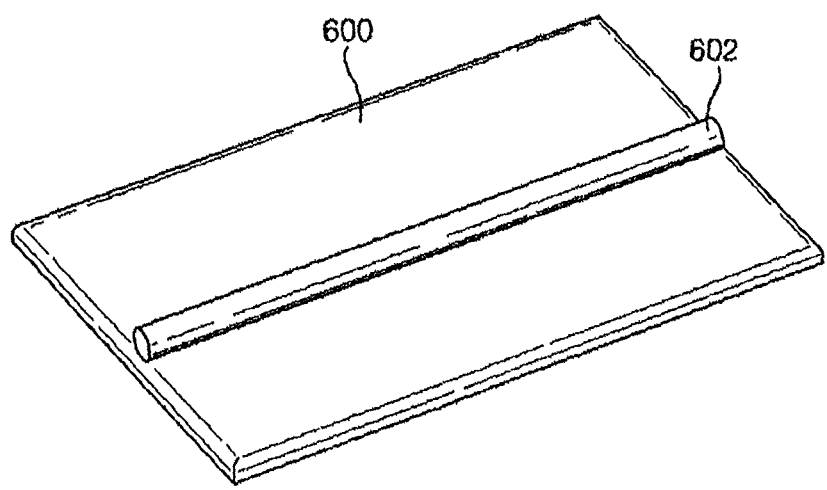
FIG. 6 is a schematic view of an optical fibre structure in accordance with the present invention.

In FIG. 6, a substrate 600 is shown on which an optical fibre tape 602 is located. The tape 602 is sticky enough to be hand laid onto the substrate 600 and to remain in position until it is cured. The optical fibre tape 602 may comprise one or more optical fibres bonded to the tape during manufacture. The optical fibres may be in the form of a ribbon fibre. The optical fibre tape 602 may have an adhesive layer formed thereon or it may be soaked in epoxy resin, for example.

Figure 7:
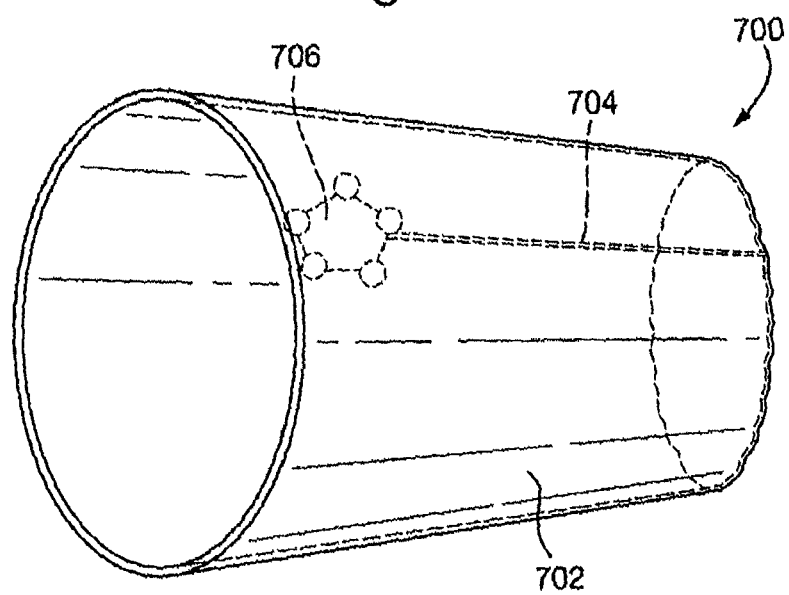
FIG. 7 is a schematic view of laying an optical fibre in accordance with the present invention.

FIG. 7 illustrates an arrangement 700 in which an optical fibre can be laid automatically or autonomously. Here, a pipe 702 is shown in which an optical fibre 704 is to be laid. As shown, the pipe 702 is not suitable for laying the optical fibre with any of the arrangements described above. In this case, a mobile robot 706 has a fibre laying head (not shown) located within it. The mobile robot 706 is directed through the pipe 702 and lays optically fibre 704 on the internal circumference of the pipe 702. The operation of the fibre laying apparatus is similar to that described above with reference to FIG. 2.

It will be appreciated that the mobile robot 706 can be used in any normally inaccessible cavity to lay optical fibre 704 either as single fibres or as tape as described above.

The process of laying down optical fibre has been described with reference to FIGS. 1 to 6 above in relation to a substantially flat substrate. The present invention is not limited to flat substrates and can also be applied to three-dimensional surfaces.

Figure 8:
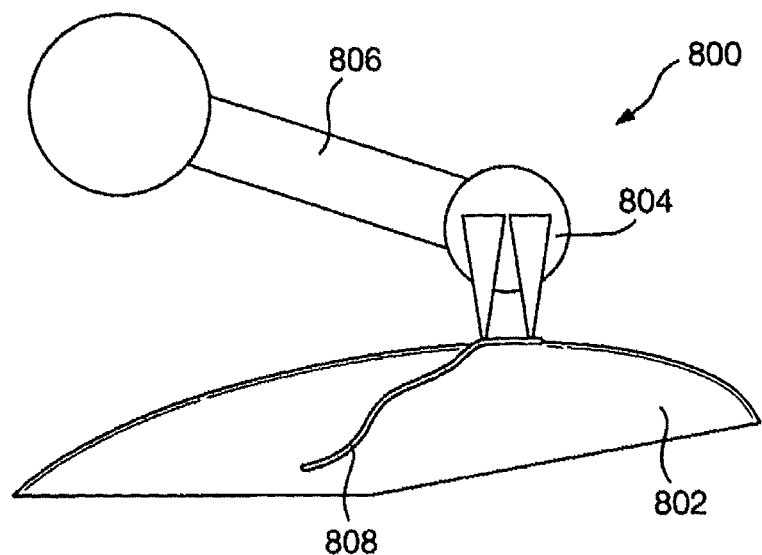
FIG. 8 is a schematic view of optical fibre laying apparatus in accordance with a fourth embodiment of the present invention.

In FIG. 8, a fibre laying head 800 is shown laying optical fibre on a substrate 802 having a three-dimensional surface. Apparatus 804 is mounted on one end of a robotic arm 806. The apparatus 804 can be of the type described with reference to FIG. 2. The robotic arm 806 can be pre-programmed for operation using any suitable programming tools. The robotic arm 806 also includes sensors (not shown) for sensing the shape of the three-dimensional surface of substrate 802 and for laying an optical fibre 808 thereon.

Although a substantially uniform three-dimensional surface is shown in FIG. 8, it will be appreciated that the head 800 can also be applied to non-uniform three-dimensional surfaces with suitable programming of the robotic arm 806.

Figure 9:
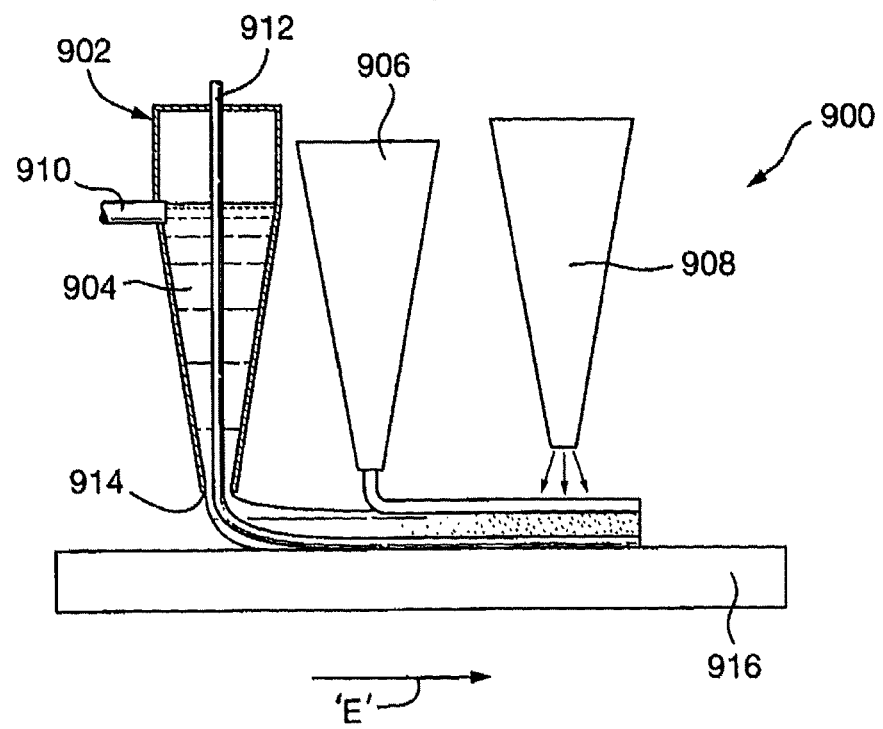
FIG. 9 is a schematic view of optical fibre laying apparatus in accordance with a fifth embodiment of the present invention.

FIG. 9 illustrates an arrangement 900 that is similar to that shown in FIG. 4. The arrangement 900 comprises a dispenser 902 containing a liquid adhesive 904, a coating head 906 and a curing head 908. The coating head 906 is located downstream of the dispenser 902 and the curing head 908 is located downstream of the coating head 906. The dispenser 902 has a top up mechanism 910 to ensure that the level of liquid adhesive 904 remains substantially constant.

Optical fibre 912 is fed from a spool (not shown) into the dispenser 902, through the liquid adhesive 904 and out through a nozzle 914. The nozzle 914 is located at a substrate 916 onto which the optical fibre 912 is to be laid. As the optical fibre 912 passes through the dispenser 902, the liquid adhesive 904 wets the fibre and provides sufficient adhesion to hold the optical fibre 912 in position temporarily on the substrate 916. The substrate 916 is arranged for movement in the direction indicated by arrow 'E' relative to the dispenser 902, the coating head 906 and the curing head 908.

Movement of the substrate 916 in the direction of arrow 'E' draws the optical fibre 912 with it due to the temporary adhesion of the wetted optical fibre 912 to the substrate 916. The coating head 906 applies additional protective coating to the optical fibre 912 to strengthen and protect it. The curing head 908 dries and cures the liquid adhesive to secure the optical fibre 912 to the substrate 916.

Although only one curing head 908 is shown, it will be appreciated that more than one such head can be provided, for example, one for drying the adhesive and one for curing it.

It will be appreciated that the arrangement of FIG. 9 could be modified so that the adhesive is cured prior to protective coating taking place.

The arrangement shown in FIG. 9 can be automated so that the laying down of optical fibre 912 and its subsequent protective coating and drying/curing is carried out without the need for the intervention of an operator.

Although the present invention has been described with reference to specific embodiments, it will be appreciated that these embodiments are not limiting. The fibre laying head as described above has many applications and can be used in many environments.

The invention claimed is:

1. A method of forming an unclad optical fibre structure, the method comprising:
    moving an optical fiber application apparatus over at least one non-planar substrate;
    dispensing both unclad optical fiber and an adhesive from said optical fiber application apparatus;
    coating said unclad optical fiber with said adhesive during dispensing;
    applying said adhesive-coated unclad optical fibre material onto said substrate proximate to said optical fiber application apparatus;
    adhering said unclad optical fiber coated in said adhesive to said substrate with said adhesive; and
    curing adhesive of the adhesive-coated unclad optical fibre material during said adhering.

2. A method according to claim 1, comprising:
    protectively coating the adhesive-coated unclad optical fibre material on the substrate during application of said adhesive coated unclad optical fiber to said substrate.

3. A method according to claim 1, wherein the adhesive-coated unclad optical fibre includes a fibre tape, the method comprising:
    arranging at least one optical fibre in an adhesive layer of the fibre tape.

4. A method according to claim 1, comprising;
    prior to applying said adhesive-coated unclad optical fiber onto said substrate, dispensing the adhesive-coated unclad optical fibre from a spool.

5. The method of claim 1 further comprising manually manipulating said optical fiber application apparatus.

6. The method of claim 1 further comprising manipulating said optical fiber application apparatus with a mobile robot.

* * * * *